(12) United States Patent
Raimarckers et al.

(10) Patent No.: US 10,393,314 B2
(45) Date of Patent: Aug. 27, 2019

(54) OIL TANK FOR A TURBOMACHINE WITH LEVEL MEASUREMENT

(71) Applicant: Safran Aero Boosters SA, Herstal (Milmort) (BE)

(72) Inventors: Nicolas Raimarckers, Tourinne (BE); Frederic Vallino, Seraing (BE); Giuseppe Giordano, Grace-Hollogne (BE)

(73) Assignee: Safran Aero Boosters SA (BE)

( * ) Notice: Subject to any disclaimer, the term of this patent is extended or adjusted under 35 U.S.C. 154(b) by 145 days.

(21) Appl. No.: 15/643,521

(22) Filed: Jul. 7, 2017

(65) Prior Publication Data

US 2018/0045367 A1 Feb. 15, 2018

(30) Foreign Application Priority Data

Aug. 11, 2016 (BE) .................................. 2016/5632

(51) Int. Cl.
| | |
|---|---|
| *F16N 19/00* | (2006.01) |
| *B29C 64/106* | (2017.01) |
| *F02C 7/06* | (2006.01) |
| *G01F 23/26* | (2006.01) |
| *F01D 21/00* | (2006.01) |
| *B33Y 10/00* | (2015.01) |
| *B33Y 70/00* | (2015.01) |

(Continued)

(52) U.S. Cl.
CPC .......... *F16N 19/003* (2013.01); *B29C 64/106* (2017.08); *F01D 21/003* (2013.01); *F02C 7/06* (2013.01); *G01F 23/263* (2013.01); *B29K 2995/0005* (2013.01); *B29L 2031/712* (2013.01); *B33Y 10/00* (2014.12); *B33Y 70/00* (2014.12); *B33Y 80/00* (2014.12); *F01D 25/18* (2013.01); *F01M 11/12* (2013.01); *F05D 2220/323* (2013.01); *F05D 2230/30* (2013.01); *F05D 2260/98* (2013.01); *F16N 2250/18* (2013.01); *Y02T 50/671* (2013.01)

(58) Field of Classification Search
CPC .......... B29C 64/106; B29K 2995/0005; B29L 2031/712; B33Y 10/00; B33Y 70/00; B33Y 80/00; F01D 21/003; B64F 5/40
See application file for complete search history.

(56) References Cited

U.S. PATENT DOCUMENTS 3,389,602 A * 6/1968 Clemens ................ B64G 1/402
244/135 R
3,901,079 A * 8/1975 Vogel .................... G01F 23/263
73/304 C (Continued)

FOREIGN PATENT DOCUMENTS

EP 0610050 A1 * 8/1994 ............... G01C 9/06

*Primary Examiner* — Francis C Gray
(74) *Attorney, Agent, or Firm* — Sandberg Phoenix & von Gontard P.C.

(57) ABSTRACT

An oil tank fitted to a turbomachine, for example an aeroplane turbo-jet engine. The tank includes an inner chamber containing the oil of the turbomachine, a wall with an inner surface surrounding the inner chamber, and a capacitive device for measuring the oil level. The device includes at least one electrode and potentially two parallel electrodes forming the inner surface. These electrodes are immersed in the oil to measure the oil level by measuring capacitance. A method for manufacturing a tank in which the electrodes are printed on the wall.

13 Claims, 3 Drawing Sheets

(51) Int. Cl.
*B33Y 80/00* (2015.01)
*B29L 31/00* (2006.01)
*F01D 25/18* (2006.01)
*F01M 11/12* (2006.01)

(56) References Cited

U.S. PATENT DOCUMENTS

| | | | | |
|---|---|---|---|---|
| 7,644,889 | B2 * | 1/2010 | Johnson | B64D 37/00 |
| | | | | 244/135 R |
| 9,193,429 | B1 * | 11/2015 | Langenfeld | F01M 11/12 |
| 2011/0079078 | A1 * | 4/2011 | Ho | G01F 23/268 |
| | | | | 73/304 C |
| 2012/0118412 | A1 * | 5/2012 | Barry | F04D 15/0218 |
| | | | | 137/565.01 |
| 2015/0260563 | A1 | 9/2015 | Venter | |
| 2017/0211412 | A1 * | 7/2017 | Raimarckers | F01D 25/18 |

\* cited by examiner

OIL TANK FOR A TURBOMACHINE WITH LEVEL MEASUREMENT

CROSS-REFERENCE TO RELATED APPLICATIONS

This application claims the benefit, under 35 U.S.C. § 119, of BE 2016/5632 filed Aug. 11, 2016, the disclosure of which is incorporated herein by reference in its entirety.

FIELD

The invention relates to the measuring of liquid level in a tank of a turbomachine. The invention relates to an axial turbomachine, e.g., an aeroplane turbo-jet engine or an aircraft turboprop, that includes a tank. The invention relates to a method for manufacturing a tank.

BACKGROUND

Turbo-jet engines use oil during operation. This fluid is used for lubrication, but also for heat exchanges. Heat exchanges means both cooling certain components and heating numerous zones subject to icing. Furthermore, the oil may be pressurized in order to actuate hydraulic cylinders.

This fluid plays a crucial role, and therefore must be properly conserved and the quantity of oil available in the turbo-jet engine must be precisely measured. To satisfy this latter requirement, oil tanks commonly have a window for showing the level of liquid stored. The window is a piece of transparent glass enabling the inside of the tank to be checked by simple visual inspection.

Patent application US 2015/0260563 A1 proposes a tank for an aeroplane including direct oil-level vision device and an independent electronic sensor. This independent sensor can work automatically by measuring the capacitance of the oil contained in the tank. However, although this independent sensor improves the correlation of the measurement of the oil level in the tank with the direct vision device, the sensor occupies a certain volume inside the tank. Moreover, installing the sensor inside the storage space is complex.

Furthermore, specific attachment means are provided to keep the sensor independent inside the tank. These attachment means may include pins cooperating with through-holes, or welds. Since sealing must be guaranteed under extreme conditions, additional measures are then required. Furthermore, complex quality and sealing checks are also required.

SUMMARY

The invention is intended to address at least one of the problems presented by the prior art. More specifically, the invention is intended to simplify the manufacture of a tank with a level measurement device. The invention is also intended to propose a robust, lightweight, cheap, reliable solution that is easy to produce, maintain and inspect.

The invention relates to a turbomachine tank, the tank being designed to contain a liquid of the turbomachine, for example oil, the tank including an inner chamber designed to contain the liquid in the tank, a wall with an inner surface surrounding the inner chamber, and a capacitive device for measuring liquid level, in various instances the device includes at least one electrode, and in various other instances two electrodes, that form the inner surface and are designed to be in electrical contact with the liquid in order to measure the level of same.

According to various advantageous embodiments of the invention, the two electrodes extend in parallel over most or substantially all of the height of the inner chamber.

According to various advantageous embodiments of the invention, the inner surface has a portion delimited by the two electrodes, the portion extending mostly vertically.

According to various advantageous embodiments of the invention, the tank includes an angular sector containing the or each electrode of the device, the angle α of the angular sector being equal to or less than 90° or 45° or 30°.

According to various advantageous embodiments of the invention, the tank includes an electrically insulating layer insulating the wall of the or each electrode.

According to various advantageous embodiments of the invention, the inner chamber has a bottom and a top, the or each electrode being separated vertically from the bottom and/or the top.

According to various advantageous embodiments of the invention, the wall includes a weld about the inner chamber.

According to various advantageous embodiments of the invention, the tank includes a lower portion and/or an upper portion that is separated from the or each electrode by a weld.

According to various advantageous embodiments of the invention, the wall includes a metal sheet forming a substantially cylindrical compartment designed to contain the or each electrode.

According to various advantageous embodiments of the invention, the thickness of the or each electrode is equal to or less than 1.00 mm or 0.20 mm or 0.05 mm.

According to various advantageous embodiments of the invention, the or each electrode is electrically insulated from the wall, for example when there is no liquid inside the tank.

According to various advantageous embodiments of the invention, the two electrodes are parallel.

According to various advantageous embodiments of the invention, the or each electrode is of constant thickness and/or constant width.

According to various advantageous embodiments of the invention, the inner surface forms a closed loop around the or each electrode, in various instances over the entire height of the electrode or electrodes.

According to various advantageous embodiments of the invention, the inner surface is curved and/or has a double curve around the electrode or electrodes.

According to various advantageous embodiments of the invention, the or each electrode is curved in the main direction thereof.

According to various advantageous embodiments of the invention, the wall is made of metal or an electric insulator.

According to various advantageous embodiments of the invention, the or each electrode extends primarily vertically.

According to various advantageous embodiments of the invention, the or each electrode forms a ribbon, the or each ribbon in various instances having two continuous vertical parallel edges.

According to various advantageous embodiments of the invention, the or each electrode extends over most of the height of the tank.

According to various advantageous embodiments of the invention, the wall includes a vertical weld and/or a horizontal weld and/or at least one circular weld.

According to various advantageous embodiments of the invention, the wall is integrally formed, or the portion of the wall receiving the or each electrode is integrally formed.

According to various advantageous embodiments of the invention, the or each electrode is applied to or pressed against the wall.

According to various advantageous embodiments of the invention, the inner surface is divided or cut by at least a welding, the or each electrode optionally crossing the welding.

According to various advantageous embodiments of the invention, the tank exhibits a constant thickness over the or each electrode. The constant thickness includes the thickness of the electrode, and the thickness of the wall.

According to various advantageous embodiments of the invention, the wall and the or each electrode form a laminate, optionally in combination with the insulating layer(s).

According to various advantageous embodiments of the invention, the capacitive device is an electrically capacitive device.

The invention also relates to a turbomachine including a lubrication circuit with an oil tank that is noteworthy in that the tank is the tank according to the invention.

According to various advantageous embodiments of the invention, the device is designed to measure the capacitance of the fluid using the or each electrode.

According to various advantageous embodiments of the invention, the capacitive device is designed to adjust to the presence of gas in the oil and/or the presence of solid particles in the oil.

According to various advantageous embodiments of the invention, the oil circuit includes a module for detecting solid particles in the oil.

According to various advantageous embodiments of the invention, the particle detection module is designed to estimate the quantity of particles in the tank, the capacitive device providing a level measurement as a function of the quantity of particles estimated.

According to various advantageous embodiments of the invention, the turbomachine includes a combustion chamber.

The invention also relates to a method for manufacturing a turbomachine tank, for example an oil tank, the method including the following steps: (a) manufacturing a tank wall forming at least part of an inner chamber designed to contain a liquid, in various instances the method also includes a printing step (b) in which an electrode of a capacitive device for measuring the level of the liquid is printed on the wall of the tank, the tank in various instances being the tank described and claimed herein.

According to various advantageous embodiments of the invention, during the manufacturing step (a), the wall is made at least in part by additive layer manufacturing, for example powder-based.

According to various advantageous embodiments of the invention, the printing step (b) uses an electrically conductive ink, in various instances with electrically conductive pigments.

According to various advantageous embodiments of the invention, the or each electrode includes copper and/or silver and/or nickel and/or platinum and/or graphene oxide and/or graphite oxide and/or organic polymers.

According to various advantageous embodiments of the invention, the manufacturing step (a) and the printing step (b) are performed simultaneously.

According to various advantageous embodiments of the invention, the method also includes a step (c) in which the wall is welded.

According to various advantageous embodiments of the invention, the method also includes a step (d) in which the tank is machined, in various instances away from or opposite the or each electrode.

According to various advantageous embodiments of the invention, the method also includes an electrical connection step (e) for the or each electrode outside the tank.

In general, the advantageous embodiments of each objective of the invention are also applicable to other objectives of the invention. Where possible, each objective of the invention can be combined with other objectives. The objectives of the invention can also be combined with the embodiments.

The invention simplifies the integration of electrodes. For example, in various embodiments, the electrodes are received by the wall, which constitutes the installation support thereof. Furthermore, the position of the electrodes does not significantly limit the internal volume of the tank, and does not form an obstacle preventing the introduction of miscellaneous equipment into the inner chamber.

Assembly and manufacture of each portion of the tank is kept simple. The presence of electrodes on the wall can be automated and the related checks remain simple. This is due to the fact that the electrodes can be positioned in the tank in an open configuration, i.e., when the different portions thereof are separate. This optimizes the accessibility of the inner chamber, regardless of the size of the neck receiving the stopper.

The present method for integrating the electrodes enables same to be made larger without being limited by the geometric constraints of the tank. Naturally, the cost of the electrodes themselves is reduced. Moreover, the measurement precision is increased.

DRAWINGS

DETAILED DESCRIPTION

In the description below, the axial direction corresponds to the direction running along the axis of rotation of the turbomachine. The radial direction is perpendicular to the axis of rotation. Upstream and downstream refer to the main direction of flow of the flow in the turbomachine. The height and vertical aspect of the tank relate to the normal assembly direction.

Figure 1:
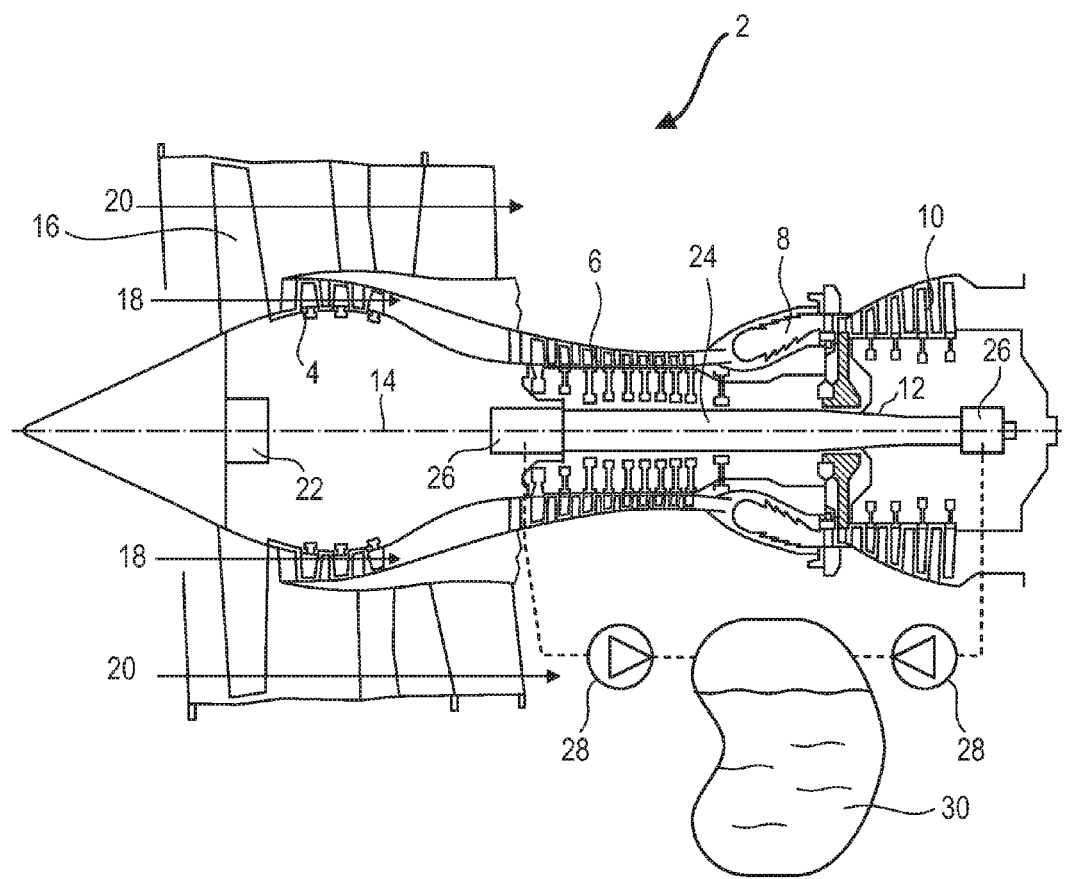
FIG. 1 shows an axial turbomachine with a tank according to various embodiments of the invention.

FIG. 1 is a simplified representation of an axial turbomachine. In this example, it is a dual-flow turbo-jet engine. The turbo-jet engine 2 has a first compression level, referred to as the low-pressure compressor 4, a second compression level, referred to as the high-pressure compressor 6, a combustion chamber 8, and one or more turbine levels 10. When in operation, the mechanical power of the turbines 10 transmitted via the shafts to the rotor 12 moves the two compressors 4 and 6. These latter have several rows of rotor blades associated with rows of stator vanes. The rotation of the rotor about the axis of rotation 14 thereof thereby enables an air flow to be generated and progressively compressed until entry into the combustion chamber 8.

An inlet fan 16 is coupled to the rotor 12 and generates an air flow that is divided into a primary flow 18 passing through the different levels mentioned above of the turbomachine, and a secondary flow 20 that passes through an annular duct. Reduction means, such as an epicycloidal step-down gear 22, can be used to reduce the rotational speed of the fan 16 and/or of the low-pressure compressor 4 in relation to the related turbine level 10. The secondary flow 20 can be accelerated to generate a thrust reaction useable in aeroplane flight.

The primary flow 18 and the secondary flow 20 are radially concentric annular flows. Such progressive flows are enabled by several rotors 12 with independent shafts 24. These shafts 24 can be coaxial and fitted into one another. The shafts are moveable in rotation on bearings 26 arranged at the interfaces of same with the housing of the turbomachine 2, or using bearings at the inter-shaft interfaces of same.

The bearings 26 and the optional epicycloidal step-down gear 22 are cooled and/or lubricated by an oil circuit, which can be closed. This circuit can belong to the turbomachine 2. The circuit can also supply actuators such as cylinders (not shown). The oil circuit can also include a heat exchanger (not shown) for cooling the oil. The bearings 26 are arranged in enclosures, which are usually sealed by gaskets arranged about the shafts. The enclosures enable the bearings 26 to be lubricated by oil spray. The oil takes on air when in contact with the bearings 26, such that the recovered oil is a liquid air/oil mix, for example containing at least 1% of air by volume.

The enclosures, which can be dry housings, are provided with aspiration orifices, also known as drainage orifices, in communication with the pumps 28. The pumps 28 can be volumetric pumps, for example to control the flow rate. The oil circuit can thus include several oil recovery lines converging on a tank 30, which can be the main tank. The tank 30 is also the starting point for several feed lines (not shown) for the bearings 26 and other miscellaneous equipment.

The tank 30 can be attached to the nacelle of the turbomachine, or to a compressor housing. Attachment to an intermediate housing is possible. The tank 30 can be placed between two annular walls guiding the concentric flows, for example the secondary flow 20 and the flow surrounding the turbomachine, or between the primary flow 18 and the secondary flow 20. In order to increase the useable volume of same, the tank 30 is essentially elongate, while having a general curved shape. This curvature enables arrangement between two curved, close partitions. The tank can, for example, be close to a source of heat, and the temperature of same can reach 100° C., and moreover can be exposed to the vibrations of the turbomachine.

Furthermore, operation of the turbomachine causes wear to the bearings 26 and the pumps 28. This wear releases metal particles into the lubrication circuit. These particles are also found in the oil in the tank, and can change the electrical properties of the oil.

Figure 2:
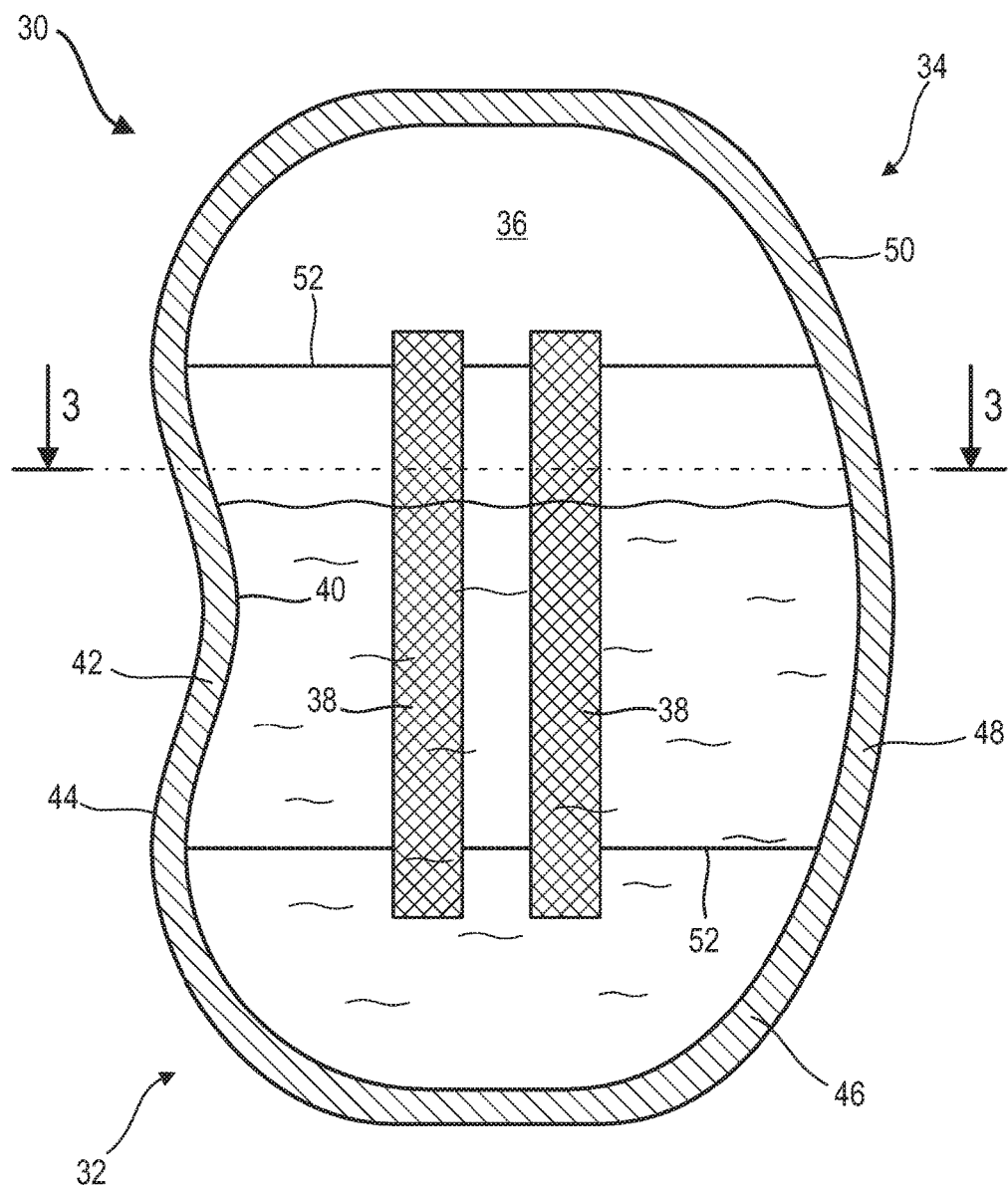
FIG. 2 shows a turbomachine tank according to various embodiments of invention.

FIG. 2 is a cross section of an oil tank 30 such as the one in FIG. 1.

The tank 30 is partially filled with oil. The lower portion 32 of same contains a mixture of oil, air and impurities, such as the metal particles generated by wear. The upper portion 34 of same can contain air, or at least an essentially gas phase. The tank 30 is provided with a level measurement device in the inner chamber 36 of the tank 30 in order to monitor the liquid level therein. The inner chamber 36 can be the main chamber of the tank 30. The principal aspect refers to the largest receptacle of the tank.

The device is capacitive. The device includes at least one electrode 38 or two electrodes 38 placed in the inner chamber 36 and in electrical contact with the oil. The electrodes are immersed in the oil. The volume or mass of oil in the tank 30 can be determined by measuring the capacitance of the oil. The oil then becomes an electrical capacitor.

The measurement device can also use data supplied by a module for detecting metal particles in the oil. The device can estimate and correct the oil level measured as a function of the influence of the metal particles in the oil. The extent of the gas phase in the oil can also be taken into account.

The electrodes 38 form part of the inner surface 40 of the tank 30, this inner surface also being formed by the wall 42 of the tank 30. This wall 42 forms the structure of the tank 30, delimiting the storage volume and the outer surface 44 thereof. This wall can include brackets for attachment to the structure of the turbomachine.

The electrodes 38 can form two parallel ribbons. The electrodes can be of the same length, the same width and the same thickness. The length can be the same as the height of the electrodes. The height of the electrodes can be at least 10% of the height of the tank 30, or the majority of the height of the tank. The electrodes can cover the majority of the height of the useable volume of the tank and/or the entire height of the zone through which the liquid level varies. This is intended to improve measurement precision.

The wall 42 can include a lower portion 46, a central portion 48 and an upper portion 50. These portions can be welded to one another, for example using weld seams 52 forming loops. Each of these portions can be integrally formed. Alternatively, the central portion can be made from a metal sheet. The central portion is optional, since the lower and upper portions can be connected directly to one another.

The tank 30 can include other equipment. For example, the tank can have inlet and outlet orifices (not shown). A stopper (not shown) can be placed in the upper portion, for example at the top of same. A deserter, a vent and/or an oil separator (not shown) can be associated with the tank 30. Valves can also be associated with the inlet and/or the outlet.

Figure 3:
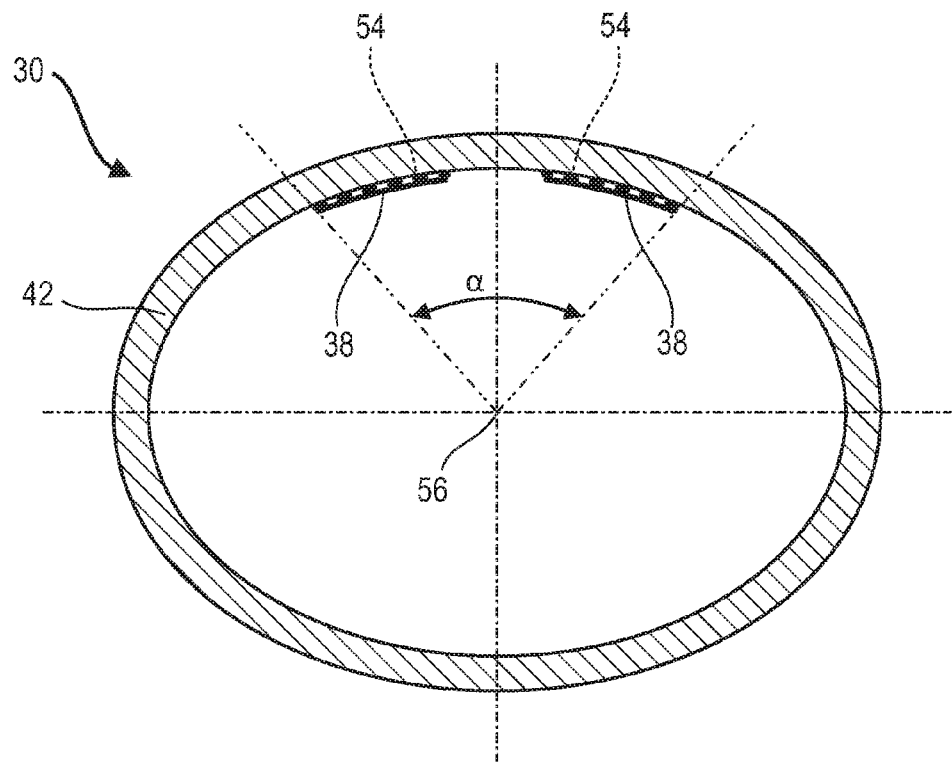
FIG. 3 is a cross section of the tank along the line 3-3 shown in FIG. 2 according to various embodiments of the invention.

FIG. 3 is a cross section of the tank 30 taken along the line 3-3 shown in FIG. 2. The electrodes 38 are shown here in cross section. The electrodes occupy a concave face of the wall 42.

If the wall 42 is made of an electrically conductive material, one or more insulating layers 54 can be provided. Each insulating layer 54 electrically insulates the wall 42 from the electrodes. The layers break the contact at the wall/electrode interface. The wall 42 is thicker than the electrode 38. The thickness of these latter can be equal to or less than 0.10 mm.

The two electrodes 38 can be essentially close to one another. The electrodes can be positioned in an angular sector forming a fraction of one turn of the tank 30. The angular sector can be measured in relation to a vertical axis 56 at the centre of the tank 30. The angular sector containing the electrodes 38 can have an angle α equal to or less than 90°.

According to one variant of the invention, a single electrode is placed in the tank, the device using the metal wall of the tank as the other electrode.

Figure 4:
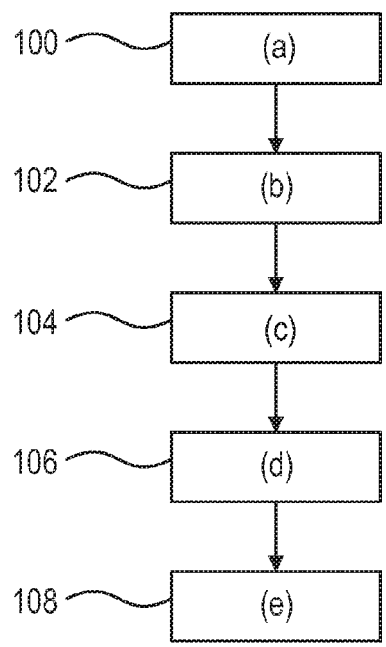
FIG. 4 is a diagram of a method for manufacturing a tank according to various embodiments of invention.

FIG. 4 is a diagram of a manufacturing method for a tank. The tank can be the tank described in relation to FIGS. 1 to 3.

The method can include the following steps, in various instances carried out in the following order:

The first stem (e.g., step (a)) is manufacturing a tank wall forming at least part of an inner chamber designed to contain a liquid, the wall in various instances being made of several portions, as indicated at 100.

A subsequent step (e.g., step (b)) is printing one or more electrodes of a capacitive device for measuring the level of the liquid on the inner face of the wall of the tank, as indicated at 102

A subsequent step (e.g., step (c)) is welding the portions of the wall such as to close the inner chamber, as indicated at 104.

A subsequent step (e.g., step (d)) is machining the tank to make attachment surfaces, connections, which are in various instances separated from the electrodes, as indicated at 106.

A subsequent step (e.g., step (e)) is electrical connection of the electrodes outside the tank, as indicated at 108.

During the manufacturing step (a) 100, the wall can be manufactured at least in part by additive layer manufacturing, for example powder-based. The wall can comprise several portions that are welded together during the welding step (c) 104 to form a sealed assembly. This method enables complex shapes to be produced. The wall can be made of metal, for example steal, and/or using aluminium or titanium alloys.

The printing step (b) 102 uses electrically conductive ink, in various instances with electrically conductive pigments. The ink used makes it possible to provide electrodes containing copper and/or silver and/or nickel and/or platinum and/or graphene oxide and/or graphite oxide and/or organic polymers. These materials provide corrosion resistance that is useful in the context of turbo-jet engine oil, in particular due to the presence of corrosive additives.

According to various embodiments of the invention, the manufacturing step (a) 100 and the printing step (b) 102 are performed simultaneously. For example, the wall can be made by printing in three dimensions, as can the electrodes. The layers of material forming the electrodes can be made at the same rate as the layers progressively building the walls.

The present teachings have been provided in relation to an oil tank. However, these teachings can also be applied to a fuel tank or to any other tank of the turbomachine containing another liquid required by the turbomachine.

The invention claimed is:

1. A tank for a turbomachine, the tank designed to contain a liquid of the turbomachine, said tank comprising:
an inner chamber structured to contain the liquid in the tank,
a wall with an inner surface surrounding the inner chamber, and
a capacitive device structured and operable to measure a level of the liquid within the inner chamber,
wherein
the capacitive device includes at least one electrode, the at least one electrode applied against the wall in order to form the inner surface, and designed to be in electrical contact with the liquid in order to measure the level of the liquid,
the tank further comprising an electrically insulating layer insulating the wall from the at least one electrode.

2. The tank according to claim 1, wherein the at least one electrode comprises two electrodes and the two electrodes extend in parallel over at least most of the height of the inner chamber.

3. The tank according to claim 2, wherein the inner surface has a portion delimited by the two electrodes, the portion extending mostly vertically.

4. The tank according to claim 1 further comprising an angular sector containing the at least one electrode of the capacitive device, an angle α of the angular sector being equal to or less than 90°.

5. The tank according to claim 1, wherein the inner chamber includes a bottom and a top, the at least one electrode being separated vertically from the bottom and from the top.

6. The tank according to claim 1, wherein the wall includes a weld about the inner chamber.

7. The tank according to claim 1, wherein the tank includes a lower portion and an upper portion that is separated from the at least one electrode by a weld.

8. The tank according to claim 1, wherein the wall includes a metal sheet forming a substantially cylindrical compartment designed to contain the at least one electrode.

9. The tank according to claim 1, wherein the thickness of the at least one electrode is equal to or less than 1.00 mm.

10. A turbomachine, said turbomachine comprising:
a lubrication circuit with an oil tank, wherein the oil tank comprises:
an inner chamber structured to contain the liquid in the oil tank,
a wall,
an inner surface that surrounds the inner chamber and is partially formed by the wall, and
a capacitive device structured and operable to measure a level of the liquid, the capacitive device including at least one electrode that partially forms the inner surface of the wall and is structured to be in electrical contact with the liquid in order to measure the level of liquid, wherein the capacitive device is designed to adjust to the presence of gas in the oil and the presence of solid particles in the oil.

11. The turbomachine according to claim 10, wherein the capacitive device is designed to measure the capacitance of the fluid using the at least one electrode.

12. An oil tank comprising:
a concave wall with an inner surface delimiting an inner chamber for containing oil,
a capacitive device structured and operable to measure a level of oil within the inner chamber,
wherein
the capacitive device includes two electrodes applied against the concave wall in order to form the inner surface, and designed to be in electrical contact with the liquid in order to measure the level of the liquid.

13. The oil tank of claim 12, wherein the two electrodes are distant from one another such as to define an angular sector of 90°, measured from a vertical central axis of the tank.

* * * * *